(12) United States Patent
Waldenberger et al.

(10) Patent No.: US 6,494,977 B1
(45) Date of Patent: Dec. 17, 2002

(54) METHOD FOR ADHERING DECORATIVE PART TO A VEHICLE

(75) Inventors: Dean A. Waldenberger, Lake George, NY (US); Charles A. Smith, Queensbury, NY (US)

(73) Assignee: Norton Performance Plastics Corporation, Wayne, NJ (US)

( * ) Notice: Subject to any disclaimer, the term of this patent is extended or adjusted under 35 U.S.C. 154(b) by 1037 days.

(21) Appl. No.: 08/872,263

(22) Filed: Jun. 10, 1997

Related U.S. Application Data

(62) Division of application No. 08/552,820, filed on Nov. 3, 1995, now Pat. No. 5,681,868.

(51) Int. Cl.[7] .............................................. B32B 31/14
(52) U.S. Cl. ....................... 156/78; 156/306.9; 156/315; 156/331.4; 521/159; 521/160; 521/174
(58) Field of Search ................................. 521/159, 160, 521/174; 156/78, 306.9, 315, 331.4

(56) References Cited

U.S. PATENT DOCUMENTS

| | | | | |
|---|---|---|---|---|
| 3,013,924 A | * | 12/1961 | Taft et al. ..................... | 156/78 |
| 3,030,249 A | * | 4/1962 | Schollenberger et al. ..... | 156/78 |
| 3,813,380 A | * | 5/1974 | Bock et al. ............... | 156/331.4 |
| 3,821,130 A | * | 6/1974 | Barron et al. ................ | 521/159 |
| 4,145,465 A | | 3/1979 | Sanderson et al. | |
| 5,102,714 A | * | 4/1992 | Mobley | |
| 5,227,409 A | | 7/1993 | Mobley et al. | |
| 5,250,607 A | | 10/1993 | Comert et al. | |
| 5,447,745 A | | 9/1995 | Descamps | |

FOREIGN PATENT DOCUMENTS

| | | |
|---|---|---|
| EP | 405721 A1 | 1/1991 |
| EP | 452754 A2 | 10/1991 |
| EP | 601582 A1 | 6/1994 |
| FR | 2237945 | 7/1974 |
| JP | 5177724 A | 7/1993 |

OTHER PUBLICATIONS

Optimizing Properties of Low Monol Polyols Improve Perform, Adhesives&Sealants Industry, Jun./Jul. 94, pp. 38/42, N. Barksby and G. Allen.

* cited by examiner

*Primary Examiner*—John J. Gallagher
(74) *Attorney, Agent, or Firm*—Mary E. Porter; Volker R. Ulbrich; Jeffrey C. Lew

(57) ABSTRACT

A pressure sensitive adhesive consisting of a polyurethane foam is used for adhering decorative parts to automobiles and other vehicles. The adhesive is characterized by high tensile strength and elongation, excellent peel strength and good thermal and mechanical stress tolerance.

22 Claims, No Drawings

METHOD FOR ADHERING DECORATIVE PART TO A VEHICLE

This is a divisional of application(s) Ser. No. 08/552,820 on Nov. 3. 1995, now U.S. Pat. No. 5,681,868.

BACKGROUND OF THE INVENTION

The present invention relates to an improved adherence of decorative parts to vehicles, such as body side moldings and exterior ornamentation on automobiles and aluminum skins on truck trailers. More particularly, the present invention relates to adhering such decorative parts by means of a polyurethane foam especially designed to have sufficient adhesive capacity, suitable high and low temperature physical properties, stress-relieving properties and other functional characteristics previously achieved only with a combination of acrylic adhesive and sealing foam.

Polyurethane foam sealants have traditionally been prepared using a polyol precursor material having 100% diol content, or a mixture of diols and triols and less than 1% monol content. This polyol material is reacted with an isocyanate precursor material to form a variety of polyurethanes. See, "Optimizing Properties of Urethane Sealants," *Adhesives & Sealants Industry,* June/July 1994, pp. 38–42. Such polyurethane sealants have essentially no tack or resistance to peel and are not useful for adhering decorative parts to vehicles.

Polyurethane adhesives of various types are well known and typical compositions are disclosed in U.S. Pat. Nos. 3,779,794, 4,624,996, 4,625,012, 5,102,714, and 5,227,409. However, while these products may exhibit good adhesiveness and other desirable physical properties for use in attaching automotive and decorative parts, none have also been found to have completely suitable stress-relieving capability and low temperature properties. In an attempt to overcome these problems of polyurethane adhesives, adhesive and foam combinations have been suggested. For example, EP-A-0,601,582 teaches the use of a foam elastomer substrate in combination with a pressure-sensitive adhesive to provide high adhesion to rough surfaces.

Current commercially available adhesive foam combinations, while having improved stress-relieving capability, have not had an adequate overall combination of adhesiveness, peel strengths on multiple surfaces, resistance to degradation at low temperature, elongation, and the like to meet the demands of the marketplace. These deficiencies are particularly notable in the demanding systems existing in the automotive industry. Painted steel or fiber reinforced plastic composite vehicle surfaces and decorative trim manufactured from thermoplastic polymers, such as olefins and polyvinylchloride, having poor wettability characteristics are widely used in the industry.

As a result, much of the adherence of automotive parts today is accomplished by coating both sides of a foam strip with expensive acrylic pressure sensitive adhesive layers so adhesive contacts the vehicle and the decorative trim or part. In view of the ongoing desire to both simplify and reduce the cost of the manufacture of automobiles, trucks, boats, trailers, trains and other vehicles, research and development continues to seek improved adhesive systems. The present invention is a result of that ongoing research.

SUMMARY OF THE INVENTION

This invention provides a method for adhering a decorative part to a vehicle, comprising the steps of:

(a) applying a pressure sensitive adhesive consisting of a polyurethane foam having a density of about 20 to 55 lbs/cu ft to an inner surface of the decorative part; and (b) joining the decorative part to the vehicle by means of a bond formed by the polyurethane foam, wherein the bond between the decorative part and the vehicle is substantially free of any adhesive other than the polyurethane foam and the bond has an ASTM D-1000-87 peel test strength of at least 2 lbs/inch.

The polyurethane foam of the invention comprises a reaction mixture of:

(a) 100 parts of a substantially linear polyether polyol having a monol molecule content greater than about 3 weight %, a functionality of less than 2, a functional molecular weight of about 3,000 to 5,000 and a viscosity of about 700 to 1,500 centipoise at 25° C.;

(b) 12–18 parts of a modified polyisocyanate, comprising about 40–50 weight % 4,4'-diphenylmethane diisocyanate, about 15–25 weight % 2,2- and 2,4-diphenylmethane diisocyanates, about 10–20 weight % oligomers of the diphenylmethane diisocyanates, and less than about 2 weight % phenyl isocyanate, and having an isocyanate molecule content of about 25–30 weight %, a viscosity at 25° C. of about 100–200 mPa, and an equivalent weight of about 140–170;

(c) 0.1–1 parts of a thermal urethane catalyst;

(d) 1–5 parts of a silicone surfactant; and (e) 8–15 parts of a foam generator, wherein sufficient gas is introduced into the mixture by the foam generator to yield a density of 20 to 55 lbs/cu ft.

The polyurethane foam may also comprise at least one component selected from the group consisting of 1–5 parts of chain extender, 0.03–3 parts of pigment, and 0.1–1 parts of epoxy stabilizer. In a preferred composition, the urethane catalyst is an organo-tin catalyst, the chain extender is a dialkylene-glycol and the epoxy stabilizer is a Bisphenyl A epichlorohydrin.

If the decorative part comprises an annodized aluminum surface and the polyurethane foam is adhered to the annondized aluminum surface, then the bond between the vehicle and the decorative part has an ASTM D-1000-87 peel test of at least 6 lbs/inch, without the use of an added layer of a pressure sensitive adhesive or a primer.

If the decorative part consists of a thermoplastic olefin polymer, or otherwise is difficult to wet with the polyurethane foam, then the method of the invention includes the further step of adding an interlayer composition, such as an acrylic adhesive, or an acrylic polymer primer, or a primer blend of acrylic polymer/hydroxy terminated polyvinyl chloride or a silane coupling agent, between the polyurethane foam and the vehicle part to provide a bond between the vehicle and the decorative part having a peel test strength of at least 6 lbs/inch. However, the amount of adhesive required in combination with the polyurethane foam of the invention is about 10–60% less than the amount required by prior art combinations.

DETAILED DESCRIPTION OF THE INVENTION

The polyurethane foam used in the present invention is the reaction product of a reaction mixture containing a hydroxyl-terminated polyurethane prepolymer, a modified polyisocyanate, a urethane catalyst, a surfactant, and optionally, a chain extender, an epoxy stabilizer and a pigment, wherein components are reacted in the presence of glass microbubbles or some other foam generator or with a process which creates a foam in the polyurethane product.

In a preferred aspect, the present invention utilizes a hydroxyl-terminated polyurethane prepolymer. The prepolymer is prepared from a substantially linear polyether polyol having a high monofunctional molecule (monol) content, i.e greater than about 3 weight %, a functionality less than 2, and preferably a molecular weight of about 3,000 to 5,000 and a viscosity of about 1,200 to 1,800 centipoise. A suitable polyether polyol is sold by Bayer, Inc., under the Multranol 9111 tradename. The polyol is reacted with a small amount of modified polyisocyanate to yield the prepolymer.

The modified polyisocyanate is preferably an isocyanate mixture such as one containing about 40–50 wt % 4,4'-diphenylmethane diisocyanate (MDI), about 15–25 wt % 2,2- and 2,4-diphenylmethane diisocyanates, about 10–20 wt % higher oligomers of these MDIs, and less than about 2 wt % phenyl isocyanate, and having an isocyanate molecule (NCO) content of about 25–30%, a viscosity at 25° C. of about 100–200 mPa, and an equivalent weight of about 140–170. Those skilled in the art will recognize that other isocyanates such as toluene diisocyanates (TDI) or various isocyanate terminated prepolymers can also be used.

The urethane catalyst is a thermal or other delayed action urethane catalyst, (i.e. activated by heat), preferably a tin catalyst, more preferably an organo-tin, such as stannous dioctoate which is optionally dissolved in an organic solvent such as dioctylphthalate, or polyglycols, or various polyether or polyester polyols. The urethanes herein represent elastomeric products which are characterized by a segmented structure of the primary chain. The two segments are referred to as hard and soft segments. Soft segments are formed from the high molecular weight polyol and are characterized by high flexibility and low glass transition temperatures. The hard segments formed from a chain extender lend tensile strength and toughness to the elastomer.

The chain extender material is used in minor amounts, especially if the polyol is nominally difunctional. As used herein, "chain extenders" include compounds having about 2–4 active hydrogen containing groups per molecule and an equivalent weight from about 30 to 500, preferably about 50 to 100. Better tack is maintained if the functionality is in excess of about 2.2 and the compound has the preferred equivalent weight. Preferred amounts of chain extended are about 1–5 parts, by weight, based on 100 parts of the polyol prepolymer described herein. The chain extender lends tensile strength and toughness to the elastomer. The chain extender is preferably a dialkyleneglycol, such as dipropylene glycol.

The polyurethane reaction mixture must be foamed prior to or during curing. Any method known in the art may be used, provided appropriate foam density, tensile strength, elongation and adhesion characteristics are maintained. Physical means, such as frothing the composition, may be used. A gas, such as air, nitrogen, carbon dioxide or some other inert gas, is whipped into the reaction mixture to create cells of gas. Chemical blowing agents may be used. Suitable blowing agents include, but are not limited to, low boiling alkanes, halogenated alkanes, azo blowing agents, and other materials, such as water, which generate a gas under reaction or curing conditions encountered in making the polyurethane foam.

The foam preferable contains glass microbubbles to generate a foam, wherein the diameter of the microbubbles ranges from 1 to 150 micrometers, and most preferably from about 15 to about 30.

The surfactant is preferably a silicone surfactant. Any surfactant may be used which ensures good wet out of the various ingredients and good coating characteristics on the release paper. The amount of surfactant is preferably 0.5–1 parts, by weight, based on 100 parts of the polyol prepolymer. If mechanical means are used to foam the composition, surfactant content is increased 2–3 times.

The adhesive may also contain a pigment (optional) to tint the foam in color desirable for specific applications. Examples of pigments include carbon black, $TiO_2$ Titanium Dioxide, and $Fe_2O_3$ Iron Oxide.

The foam also has an epoxy stabilizer which stabilizes it against heat degradation. Epoxy stabilizers useful herein include, but are not limited to, epoxidized soybean oil and Bisphenol A/epichlorohydrin, which may be used at 0.1–1 parts, by weight, based on 100 parts of polyol prepolymer.

Other optional components, such as are known for use in adhesives and polyurethane foams, may be utilized provided their use does not detract from the tensile strength, elongation, thermal and mechanical stress stability and adhesion characteristics of the polyurethane foam.

The polyurethane foam may be formed by mixing the components and applying the mixture to a substrate where it is cured to a polyurethane foam. Application of the reaction mixture may be with a doctor blade, or any convenient manner to form a layer on the substrate. Curing is preferably done through the application of heat, but may be by any other convenient manner. Heat is applied for a sufficient time to utilize substantially all isocyanate, e.g., for up to about 2 hours at about 90° to 200° C., and the completion of the cure may be monitored by measuring free isocyanate groups.

If a polyol prepolymer is not formed at the beginning of the process, the viscosity of the reaction mixture prior to curing will be too low for handing on a release paper in conventional manufacturing processes. In the case of a low viscosity reaction mixture not containing the prepolymer, the polyurethane foam may be cured, e.g., in a mold lined with release paper, rather than on the surface of the release paper to yield a sheet or strip of the foam.

Thus, while the pressure-sensitive polyurethane foam adhesive of this invention may be made from the specific components by using conventional urethane technology, a preferred procedure entails first forming a prepolymer of the polyol and a portion of the modified polyisocyanate by reacting them in the presence of the polyurethane catalyst at room temperature under agitation for several hours, preferably 3–5 hours, to produce a hydroxyl-terminated prepolymer having a viscosity of about 8,000–15,000 centipoise. To form the prepolymer, 100 parts of high monol polyol is reacted with about 2–3 parts of the modified polyisocyanate. Thereafter, 67.5 parts of the prepolymer are combined with about 32.5 parts high monol polyol, 12–16 parts additional modified polyisocyanate, about 8–15 parts glass microbubbles, about 1–5 parts chain extender, up to about 3 parts pigment, about 0.1–2 parts surfactant, and about 0.1–1 parts epoxy stabilizer, and uniformly mixed. The uniform mixture is then coated unto a release paper at the desired thickness, generally about 0.4 to 3 mm, and cured by exposure to heat, for example 350° F. (176.7° C.) for about 3 minutes.

Unlike conventional foam mounting tapes which must be coated with one or more adhesive layers, the method of the present invention enables the foam substrate to directly adhere to the surface of an automotive part. The advantages to this are lower cost and improved efficiency.

Foams for use herein are pressure-sensitive adhesives which are capable of joining/mounting both similar and dissimilar materials. Generally, suitable materials include any metallic or plastic materials ordinarily used for automotive parts. Such materials include aluminum, stainless steel, polyvinylchloride (PVC), thermoplastic olefins (TPO) and acrylonitrile-butadiene styrene (ABS) and preferred materials include, anodized aluminum or primed PVC or TPO.

The foams exhibit a high elongation, preferably greater than about 500%, more preferably greater than about 700%. The foams have a low tensile strength, preferably of about 30–120 psi, more preferably 40–80 psi. The foams have a medium density of about 20–55, preferably about 25 to 45, pounds per cubic foot. The capacity of the foam to adhere to various substrates may be determined by a standard test such as the ASTM D-1000-87 180° peel test. The foam exhibits a 180° peel to anodized aluminum of at least about 6.0, preferably at least about 7.0, pounds per inch width.

In addition, the adhesion at elevated temperature as determined by performing a dead load shear test at 190° F. (87.8° C.) is greater than 72 hours, preferably greater than 96 hours. The dead load shear test is performed by attaching a 1 kilogram weight to a specimen composed of two 25 by 75 mm by 0.4 mm aluminum pieces joined by a 25 mm by 25 mm piece of pressure sensitive foam.

Under low temperature stress, the foam meets the cold flex requirement ESBM3G89C2 of Ford Motor Company at a temperature of –22° F. (–30° C.).

Although generally not necessary for most applications, enhanced adhesion may be obtained by adding, to one or both sides of the foam, a layer of a conventional acrylic pressure sensitive adhesive. A foam having such a secondary adhesive layer and adhered through the secondary layer to stainless steel will commonly exhibit a 180° peel of at least about 7.0, preferably 10.0 pounds per inch width.

The present invention will now be described with reference to the following Examples. It is understood that these Examples are for illustrative purposes only and should not be deemed as limiting this invention.

In the Examples which follow, a polypropylene diol MW 4,000 (Multrol 9111 polyol) and a polymeric isocyanate with a NCO functionality of 2.3–2.4 (Mondus E-448) were obtained from Bayer, Inc., Polymer Division, Pittsburgh, Pa. These materials were reacted (100 parts polyol to 2–3 parts isocyanate) with a tin catalyst (T-190 obtained from Tylo, Parsippany, N.J.) at room temperature under agitation for 4 hours, or until a viscosity suitable for application to a foam tape release paper (i.e., 8,000 to 12,000) was achieved. Ths prepolymer was then mixed with the other components and cured as described below.

EXAMPLE 1

The adhesive foam had the following composition:

| COMPONENT | PARTS BY WEIGHT |
|---|---|
| Hydroxyl terminated prepolymer | 96 |
| Dipropylene glycol | 4 |
| Silicone surfactant[a] | 1 |
| Carbon black | 0.5 |
| Scotchlite ™ glass bubbles | 10.0 |
| Bisphenyl A/epichlorohydrin | 0.5 |
| 27.5% NCO content polyisocyanate | 12.5 |

[a]3M Company, Minneapolis, Minnesota.

The foam was coated on a suitable release liner at a thickness of 1.2 mm and cured for 3 minutes at 350° F. (177° C.). The resultant product was a sheet of pressure sensitive adhesive consisting of polyurethane foam with a tensile strength of 50 psi and an elongation of 800%.

The foam was attached to the back of an anodized aluminum emblem and subsequently attached to the aluminum skin of a tractor trailer. After 24 hours, a force in excess of 25 pounds was needed to remove the emblem.

EXAMPLE 2

The foam of Example 1 was attached to an anodized aluminum backed PVC molding which was subsequently adhered to the aluminum skin of a tractor trailer. After 24 hours, a force of 15 pounds was needed to cause the end of the molding to lose adhesion.

EXAMPLE 3

The foam of Example 1 was attached to a PVC molding which had been primed with Tite-R-Bond™ 4070 primer, obtained from Norton Performance Plastics, Granville, N.Y., a blend of acrylic polymer and hydroxy-terminated polyvinyl chloride. The molding was subsequently adhered to the aluminum skin of a tractor trailer. After 24 hours, a force of 15 pounds was needed to cause the end of the molding to lose adhesion.

EXAMPLE 4

The foam of Example 1 was coated on one side with a conventional acrylic pressure sensitive adhesive (Polytac 414 obtained from H&N Chemical Company). The non-acrylic side was adhered to an aluminum backed PVC molding. The acrylic side was subsequently adhered to a sheet metal panel painted with a conventional automotive paint to simulate a molding attached to an automobile door. After 24 hours, a force of 20 pounds was needed to cause the end of the molding to lose adhesion.

EXAMPLE 5

An adhesive foam having the following composition was prepared:

| COMPONENT | PARTS BY WEIGHT |
|---|---|
| Hydroxyl terminated prepolymer | 67.5 |
| High monol polyol | 37.5 |
| Silicone surfactant | 1.0 |
| Dipropylene glycol | 2.0 |
| Carbon black | 1.0 |
| Scotchlite ™ glass bubbles | 8.0 |
| 27.5% NCO content polyisocyanate | 10.0 |

The foam was coated on a suitable release liner at a thickness of 1.2 mm and cured 3 minutes at 350° F. (177° C.). The resultant product was a sheet of pressure sensitive adhesive consisting of polyurethane foam with a tensile strength of 35 psi and an elongation of 1000%.

The foam was attached to the back of a primed TPO molding, which was subsequently attached to sheet metal panel which had been painted with a conventional automotive paint. The molding on the panel was then subjected to 5 environmental cycles consisting of:

8 hours at –30° C.

8 hours at 80° C.

8 hours at room temperature

No adhesion failure of the molding to the painted panel was noted after the cycles.

EXAMPLE 6

The ASTM D-1000-87 method 180° peel test was carried out on the polyurethane foams and controls materials. Results are shown below.

| Adhesive System | Substrate | Lbs/inch |
| --- | --- | --- |
| Example 1 | Stainless Steel | 4.3 |
| | Aluminum | 7.6 |
| | Painted Auto Panel | 2.2 |
| Example 3 (with primer) | PVC | 11.5 |
| Example 4 (with acrylic adhesive) | Painted Auto Panel | 7.5 |
| Example 5 | Stainless Steel | 5.6 |
| | Aluminum | 8.9 |
| | Painted Auto Panel | 3.4 |
| Conventional Polyurethane Foam (with 120 g/m2 acrylic adhesive) | Stainless Steel | 7.0 |
| Example 1 (with 100 g/m2 acrylic adhesive) | Stainless Steel | 11.0 |

In these peel tests the polyurethane foam of the invention had at least 2 lbs/inch peel strength without the use of primer or adhesive. With a single layer of acrylic adhesive in combination with the foam of the invention, the peel strength increased 57% over the combination of a conventional polyurethane foam with acrylic adhesive. This improvement was observed in spite of the use of 16.6%, by weight, additional acrylic adhesive with the conventional foam. A conventional polyurethane foam is characterized by a peel test strength of 0 lbs/inch.

For PVC decorative parts, the polyurethane foam of the invention, together with a PVC primer, gave superior peel test results.

We claim:

1. A method for adhering a decorative part to a vehicle, comprising the steps of:
   (a) applying a pressure sensitive adhesive consisting of a polyurethane foam having a density of about 20 to 55 lbs/cu ft to an inner surface of the decorative part; and
   (b) joining the decorative part to a painted exterior surface of the vehicle by means of a bond formed by the polyurethane foam,
   wherein the bond between the decorative part and the vehicle is free of any adhesive other than the polyurethane foam and the bond has an ASTM D-1000-87 peel test strength of at least 2 lbs/inch.

2. The method of claim 1, wherein the polyurethane foam comprises effective amounts of:
   (a) a substantially linear polyether polyol having a monol molecule content greater than about 3 weight %, a functionality less than 2, a molecular weight of about 3,000 to 5,000 and a viscosity of about 700 to 1,500 centipoise at 25° C.;
   (b) a modified polyisocyanate, comprising about 40–50 weight % 4,4'-diphenylmethane diisocyanate, about 15–25 weight % 2,2- and 2,4-diphenylmethane diisocyanates, about 10–20 weight % oligomers of the diphenylmethane diisocyanates, and less than about 2 weight % phenyl isocyanate, and having an isocyanate molecule content of about 25–30 weight %, a viscosity at 25° C. of about 100–200 mPa, and an equivalent weight of about 140–170;
   (c) a thermal urethane catalyst; and
   (d) a silicone surfactant,
   wherein a foam is created by frothing a mixture comprising (a), (b), (c) and (d) to incorporate sufficient gas to yield a cured polyurethane foam density of 20 to 55 lbs/cu ft.

3. The method of claim 2, wherein the polyurethane foam further comprises at least one component selected from the group consisting of chain extender, pigment, solvent and epoxy stabilizer.

4. The method of claim 2, wherein the urethane catalyst is selected from the group consisting of organo-tin compounds and organo-tin compounds dissolved in an organic solvent.

5. The method of claim 4, wherein the urethane catalyst is stannous dioctoate.

6. The method of claim 3, wherein the chain extender is a dialkylene-glycol.

7. The method of claim 6, wherein the chain extender is dipropylene glycol.

8. The method of claim 2, wherein the polyurethane foam further comprises glass microbubbles.

9. The method of claim 3, wherein the epoxy stabilizer is a Bisphenyl A/epichlorohydrin.

10. The method of claim 1, wherein the polyurethane foam comprises:
    (a) a substantially linear polyether polyol having a monol molecule content greater than about 3 weight %, a functionality less than 2, a molecular weight of about 3,000 to 5,000 and a viscosity of about 700 to 1,500 centipoise at 25° C.;
    (b) a modified polyisocyanate, comprising about 40–50 weight % 4,4'-diphenylmethane diisocyanate, about 15–25 weight % 2,2- and 2,4-diphenylmethane diisocyanates, about 10–20 weight % oligomers of the diphenylmethane diisocyanates, and less than about 2 weight % phenyl isocyanate, and having an isocyanate molecule content of about 25–30 weight %, a viscosity at 25° C. of about 100–200 mPa, and an equivalent weight of about 140–170;
    (c) a thermal urethane catalyst;
    (d) a silicone surfactant; and
    (e) a foam generator,
    wherein sufficient gas is introduced into a mixture comprising (a), (b), (c), (d) and (e) by the foam generator to yield a cured polyurethane foam density of 20 to 55 lbs/cu ft.

11. The method of claim 10, wherein the polyurethane foam further comprises at least one component selected from the group consisting of chain extender, pigment, solvent and epoxy stabilizer.

12. The method of claim 10, wherein the urethane catalyst is an organo-tin catalyst.

13. The method of claim 12, wherein the urethane catalyst is selected from the group consisting of stannous dioctoate, organo-tin compounds, stannous dioctoate dissolved in dioctyl phthalate solvent, and organo-tin compounds dissolved in polyglycol solvent.

14. The method of claim 11, wherein the chain extender is a dialkylene glycol.

15. The method of claim 14, wherein the chain extender is dipropylene glycol.

16. The method of claim 11, wherein the epoxy stabilizer is a Bisphenyl A/epichlorohydrin.

17. The method of claim 10, wherein the foam generator is selected from the group consisting of glass microbubbles, blowing agents and combinations thereof.

18. The method of claim 1, wherein the decorative part comprises an anodized aluminum surface, the polyurethane foam is adhered to the anodized aluminum surface and the bond between the vehicle and the decorative part has an ASTM D-1000-87 peel test strength of at least 6 lbs/inch.

19. The method of claim 1 in which the decorative part is an emblem or a piece of molding.

20. A method of adhering a decorative part to a vehicle comprising the steps of, (a) applying a pressure sensitive adhesive layer consisting of a polyurethane foam having a density of about 20 to 55 lbs/cu ft to an inner surface of the decorative part;

(b) adding onto the pressure sensitive adhesive layer an interlayer of composition selected from the group consisting of acrylic adhesive, acrylic polymer primer, and a primer blend of acrylic polymer/hydroxy terminated polyvinyl chloride, and silane coupling agents; and (c) contacting the interlayer composition with the vehicle thereby joining the decorative part to a painted exterior surface of the vehicle by means of a bond formed by the polyurethane foam and the interlayer composition;

in which the bond between the vehicle and the decorative part has a peel test strength of at least 6 lbs/inch by ASTM D-1000-87.

21. The method of claim 20, wherein the decorative part is formed from thermoplastic polymers.

22. The method of claim 20 in which the decorative part is an emblem or a piece of molding.

\* \* \* \* \*